July 4, 1950  E. G. ONSRUD  2,513,959
SUPPORTING STAND
Filed Sept. 17, 1947  2 Sheets-Sheet 1
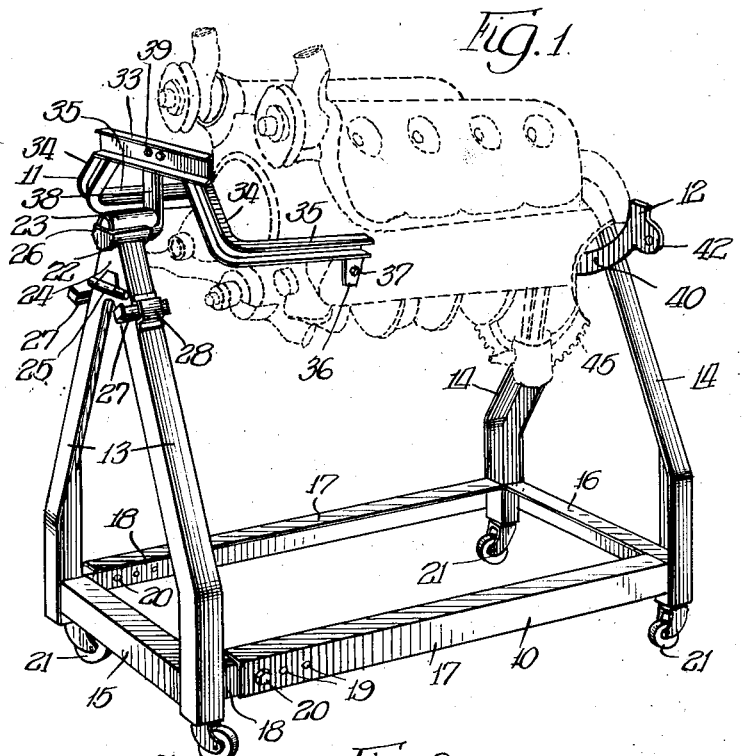
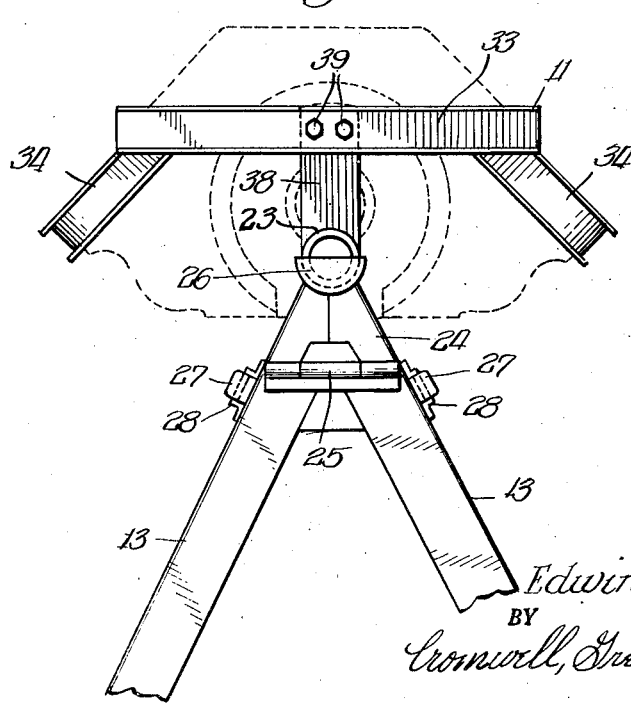
INVENTOR.
Edwin G. Onsrud,
BY
Cromwell, Greist + Warden July 4, 1950  E. G. ONSRUD  2,513,959
SUPPORTING STAND
Filed Sept. 17, 1947  2 Sheets-Sheet 2
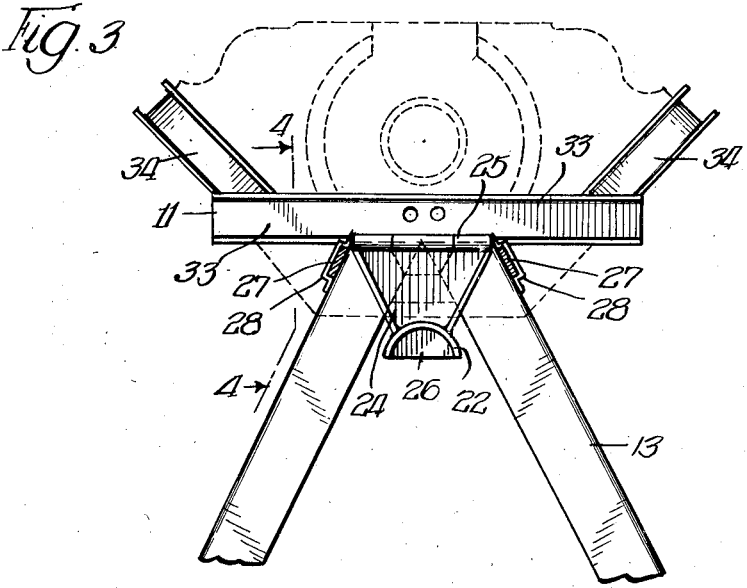
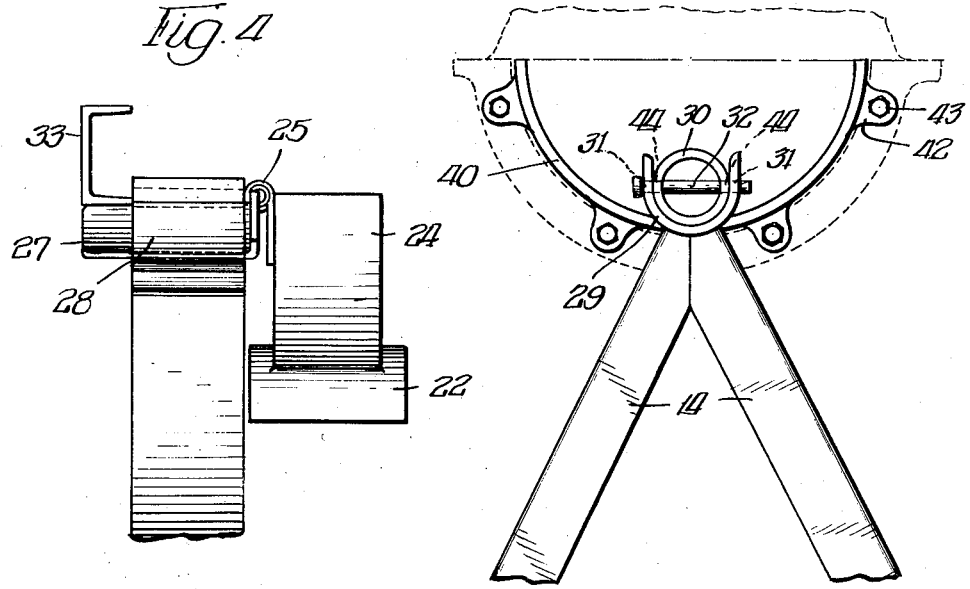
INVENTOR.
Edwin G. Onsrud,
BY
Cromwell, Greist & Warden
Attys Patented July 4, 1950

2,513,959

UNITED STATES PATENT OFFICE 2,513,959

SUPPORTING STAND

Edwin G. Onsrud, Huntley, Ill.

Application September 17, 1947, Serial No. 774,457

6 Claims. (Cl. 29—289)

This invention is concerned with improvements in a supporting stand for an automotive engine which is adapted to hold the engine in the proper position while the engine is being worked upon.

It is an object of the invention to provide a work stand for supporting in convenient position an automotive engine which permits the engine to be rotated relative to the stand to provide access to all sides of the engine and which is so constructed that in one position of the engine the camshaft may be withdrawn in an axial direction.

A further object of the inventon is to provide a supporting stand of the type described which is readily adaptable for use with a large variety of different makes of automotive engines, which is adjustable for engines of different size, which is ruggedly constructed and which may be economically manufactured.

These and other objects of the invention will be apparent to those skilled in the art from a description of the preferred form of the stand which is illustrated in the accompanying drawings, wherein:

Fig. 1 is a perspective view of a supporting stand embodying the principles of the invention with a conventional engine indicated in dotted line;

Fig. 2 is a partial end elevation of the stand;

Fig. 3 is a partial end elevation similar to Fig. 2 with the engine rotated through 180 degrees;

Fig. 4 is a view taken on the lines 4—4 of Fig. 3 to an enlarged scale; and

Fig. 5 is a partial elevation of the opposite end of the stand.

The preferred form of the stand which is illustrated in the drawings is adapted to support an automotive engine of conventional make as indicated in dotted lines. The stand is adapted to support a large variety of makes and sizes of automotive engines such as those used in automobiles, boats, etc. which are similar in construction.

The stand comprises a main supporting frame 10 which is self-supporting and horizontal end frame formations 11 and 12 which are adapted to be detachably secured to portions of the engine and to be removably supported on the main frame 10.

The main frame 10 comprises vertically extending spaced end frame members 13 and 14 which are generally V-shaped and inverted with their legs rigidly connected at the bottom by cross frame members 15 and 16, respectively.

The end frame members 13 and 14 are rigidly secured in horizontal spaced relation by adjustable side frame members. Each side frame member is formed by cooperating angle members 17 and 18, the members 17 being secured at one end to the end frame 14 and the members 18 being secured at one end to the end frame 13. The members 17 and 18 are provided with a series of spaced bolt holes 19 and bolts 20 for connecting them in adjustable relation to extend the stand horizontally for engines of different lengths. The main or supporting section 10 of the stand thus formed is made readily portable by casters 21 secured at each corner.

End frame 13 is provided at its apex with a bearing member or supporting formation 22 for a horizontally extending pivot member 23 on the frame formation 11. The pivot support 22 is rigidly secured on the top of a movable portion 24 of the end frame 13. The frame portion 24 is hingedly connected at 25 to the fixed portion of the end frame 13 so that it is adapted to be moved about the hinge 25 to an out-of-the-way position in front of the end frame 13 (Fig. 4). The pivot support 22 is closed at the outer end by an abutment 26. Adjacent the hinge 25 parallel slidable abutments or supporting bars 27 are mounted in spaced relation on the legs of the end frame by means of brackets 28. The inner ends of the bars 27 are adapted to extend a substantial distance inwardly of the frame member 13, when the bars are moved to their innermost position, for a purpose which will be described.

End frame 14 is provided at its apex with a bearing member or supporting formation 29 for a pivot member 30 which extends horizontally from the frame formation 12. The pivot support 29 is provided with transversely aligned holes 31 for receiving a locking pin 32.

The horizontal frame formation 11 which is adapted to be secured to forward portions of the engine comprises a transverse end member 33 and angular side members which have end portions 34 extending downwardly and outwardly from the ends of the member 33 and integral side portions or arms 35 extending forwardly at a right angle thereto. The side arms 35 are provided with apertured brackets 36 and bolts 37 for attaching the same to the body of the engine. The end member 33 is provided with a detachable downwardly projecting bracket or arm member 38 at the bottom of which is integrally secured the horizontally extending pivot member 23 which is adapted to be received in the pivot support 22 on the end frame member 13. The bracket member 38 is detachably secured at the center of the end member 33 by bolts 39.

The horizontal frame formaton 12 which is adapted to be secured to rearward portions of the engine comprises a transverse semi-circular member 40 which carries the horizontally extending pivot member 30. The frame member 40 is provided with apertured lugs 42 which are adapted to be secured by threaded bolts 43 to end portions of the engine. The pivot member 30 which is illustrated as a hollow tube is provided with transversely aligned holes 44 for accommodating the locking bolt 32. The pivot 30 is adapted to be received and supported in the bearing member 29 on the end frame 14 and is in axial alignment with the pivot member 23 on the end frame 11 at the other end of the engine when the end frame formations 11 and 12 are secured to the engine so that the engine may be rotated on the pivots 23 and 30 relative to the main supporting frame 10.

In using the stand the end frame formations 11 and 12 are first secured by the bolts 37 and 43 to the forward and rear ends, respectively, of the engine. The engine with the end frames 11 and 12 is then supported by positioning the pivot members 23 and 30 in the bearing members 22 and 29, respectively, the side frame members 17, 18 being first adjusted to space the end frames 13 and 14 as required. The abutment 26 assists in properly positioning the pivots 23 and 30 and also limits the forward movement of the same after they are seated in the bearing members. The locking bolt 32 is adapted to be inserted in the holes 31 and 44 to lock the engine against rotation on the stand. When the top of the engine has been stripped of its cover plates, etc., the locking pin is removed to permit rotation of the engine through 180 degrees to bring the bottom of the engine uppermost. The sliding bars 27 are withdrawn prior to rotation of the engine so that they will not obstruct the movement of the end frame 11. After the engine has been rotated the bars 27 are moved inwardly so that their inner ends extend beneath the end frame cross member 33. The pivot carrying arm 38 is then detached from the member 33 by removing the bolts 39 and the apex portion 24 of the end frame 13 is swung downwardly about the hinge 25 to the out-of-the-way position (Fig. 3). This clears the front of the engine (Fig. 3) so that the camshaft may be readily removed in an axial direction.

The horizontal frame formations 11 and 12 are illustrated as two separate units which are attached to the respective end portions of the engine. They may be connected to form a single unitary frame by extending the side arms 35 of the end frame 11 and rigidly connecting the same to the end frame 12. Different end frame formations may be provided for engines which cannot be mounted by means of the illustrated frame formations 11 and 12 without any alteration of the main supporting frame 10.

While specific detail of construction and materials have been referred to in describing the illustrated form of the stand, it will be understood that other details of construction and materials may be resorted to within the spirit of the invention.

I claim:

1. A work stand for supporting an automotive engine comprising a supporting structure having generally vertical end members arranged in adjustable spaced relation, a horizontal frame structure adapted to be attached to the engine, said frame structure having horizontally extending pivots adapted to be rotatably supported on said vertical end members, one of said pivots being removable from said frame structure, and auxiliary means on said supporting structure for supporting said horizontal frame structure with a substantial portion of the forward end of the engine accessible for the axial removal of the camshaft.

2. A work stand for supporting an automotive engine comprising a supporting structure having generally vertical end frame members, pivot supporting members on the top of said end frame members, a horizontal frame adapted to be secured to the body of the engine, said frame having end pivots cooperating with said pivot supporting members to rotatably mount the engine between said vertical end frame members, one of the end pivots on said horizontal frame being detachable, and means on one of said end frame members for supporting said horizontal frame when said pivot has been detached therefrom.

3. A stand for supporting an automotive engine comprising a supporting structure having generally vertical end members arranged in adjustable spaced relation, a horizontal frame structure adapted to be attached to the engine, said frame structure having horizontally extending pivots on the ends thereof and said vertical end members having sockets for receiving said pivots to rotatably mount the engine on said vertical end members, one of said pivots being removable from said frame structure, and movable means on said supporting structure for supporting said horizontal frame structure when said pivot has been removed therefrom whereby said engine is supported with a substantial portion of the forward end thereof accessible for the axial removal of the camshaft.

4. A work stand for supporting an automotive engine comprising a supporting structure having generally vertical end members, horizontal pivot bearing formations at the top of said end members, one of said bearing formations being movable outwardly of said supporting structure, generally horizontal frame members adapted to be detachably but rigidly secured to the body of the engine, horizontal pivot formations extending from the ends of said frame members and adapted to be received in said bearing formations, one pivot formation being detachable from said frame, and laterally adjustable auxiliary supports on said supporting structure adjacent said movable bearing formation for supporting said frame when said pivot formation is detached from the same.

5. A workstand for supporting an automotive engine comprising a supporting structure having vertical inverted generally V-shaped end members, horizontal pivot bearing formations at the apex of said end members, one of said bearing formations being hingedly movable relative to said supporting structure, a generally horizontal frame adapted to be detachably but rigidly secured to the body of the engine, horizontal pivot formations extending from the ends of said frame and adapted to be received in said bearing formations, one pivot formation being detachable from said frame, and horizontally movable auxiliary supporting elements on said supporting structure adjacent said hingedly movable bearing formation for supporting said frame when said pivot formation is detached from the same.

6. A stand for supporting an automotive engine comprising a supporting structure having laterally adjustable spaced vertical inverted V-shaped end frames, a horizontal pivot support at the apex of one of said end frames, a portion of the top of the other of said end frames being hingedly mounted and movable to an out of use position, a horizontal pivot support on said hingedly mounted portion, a separable frame adapted to be attached to the engine, said separable frame including end formations having cross members, a pivot member extending from one of said cross members, a pivot detachably connected to and extending from the other of said cross members, said detachable pivot member being adapted to cooperate with the pivot support on said hingedly mounted portion, and supplemental movable abutments on said supporting structure to support the cross member when the pivot member is detachable therefrom.

EDWIN G. ONSRUD.

REFERENCES CITED

The following references are of record in the file of this patent:

UNITED STATES PATENTS

| Number | Name | Date |
| --- | --- | --- |
| 1,000,674 | Flad | Aug. 15, 1911 |
| 1,404,075 | Van Horn | Jan. 17, 1922 |